United States Patent
Kim

(10) Patent No.: US 7,099,705 B2
(45) Date of Patent: Aug. 29, 2006

(54) TELEPHONE AND METHOD FOR CONVERTING SOUND TO IMAGE AND DISPLAYING ON SCREEN THEREOF

(75) Inventor: Gir-Ho Kim, Seongnam-Si (KR)

(73) Assignee: HarmoniColor System Co., Ltd., Seoul (KR)

(*) Notice: Subject to any disclaimer, the term of this patent is extended or adjusted under 35 U.S.C. 154(b) by 175 days.

(21) Appl. No.: 10/473,872

(22) PCT Filed: Mar. 29, 2002

(86) PCT No.: PCT/KR02/00563

§ 371 (c)(1),
(2), (4) Date: Mar. 29, 2004

(87) PCT Pub. No.: WO02/080389

PCT Pub. Date: Oct. 10, 2002

(65) Prior Publication Data

US 2005/0063532 A1    Mar. 24, 2005

(30) Foreign Application Priority Data

| Mar. 29, 2001 | (KR) | 2001-17780 |
| Apr. 9, 2001 | (KR) | 2001-20297 |
| Apr. 23, 2001 | (KR) | 2001-23259 |
| Sep. 28, 2001 | (KR) | 2001-60632 |
| Oct. 22, 2001 | (KR) | 2001-65013 |

(51) Int. Cl.
*H04B 1/38* (2006.01)
*H04B 1/00* (2006.01)

(52) U.S. Cl. .......... 455/567; 455/566; 455/569.1; 455/575.3; 379/373.03; 379/373.04; 379/374.01

(58) Field of Classification Search .......... 455/567, 455/566, 569.1, 575.3; 379/370, 373.01, 379/373.02, 373.03, 373.04, 374.01, 374.02
See application file for complete search history.

(56) References Cited

U.S. PATENT DOCUMENTS 6,621,903 B1 *  9/2003  Oda .......... 379/374.01
6,725,064 B1 *  4/2004  Wakamatsu et al. .......... 455/566

* cited by examiner

*Primary Examiner*—Matthew Anderson
*Assistant Examiner*—Tuan Pham
(74) *Attorney, Agent, or Firm*—Blakely, Sokoloff, Taylor & Zafman; Stephen M. De Klerk

(57) ABSTRACT

A telephone and a method for converting sound to image and displaying on a screen thereof are disclosed. Receiver receives a call signal. Storage section stores call sound information. Call sound output section outputs a call sound. Color display device displays a color image. Controller reads out the call sound information when the receiver receives the call signal. Controller generates a call sound through call sound output section in response to read call sound information. Controller analyzes read call sound information in a frame unit and acquires sound analyzed information. Controller displays a corresponding call sound image in response to the sound analyzed information on color display device. Accordingly, the telephone and the method for convening sound to image and displaying on a screen thereof image and display a call sound on a screen to thereby give pleasure to user and improve features of manufactured goods.

14 Claims, 18 Drawing Sheets

FIG.2

| Octave | Function | Brightness | |
|--------|----------|------------|---|
| 00b | Low | 20% | 0 |
| 01b | Mid Low | 40% | 1 |
| 10b | Mid High | 70% | 2 |
| 11b | High | 90% | 3 |

FIG.3

| CODE VALUE | MUSICAL SCALE | R G B | CODE NAME | color |
|---|---|---|---|---|
| | Mid-High    Brightness 70% |
| 0001b | C# | $R_{21}G_{21}B_{21}$ | MIDDLE OF RED AND YELLOW |  |
| 0010b | D | $R_{22}G_{22}B_{22}$ | YELLOW |  |
| 0011b | D# | $R_{23}G_{23}B_{23}$ | MIDDLE OF YELLOW AND GREEN |  |
| 0100b | E | $R_{24}G_{24}B_{24}$ | GREEN |  |
| 0101b | F | $R_{25}G_{25}B_{25}$ | BLUE CLOSE TO GREEN |  |
| 0110b | F# | $R_{26}G_{26}B_{26}$ | GREEN CLOSE TO BLUE |  |
| 0111b | G | $R_{27}G_{27}B_{27}$ | BLUE |  |
| 1000b | G# | $R_{28}G_{28}B_{28}$ | MAGENTA CLOSE TO BLUE |  |
| 1001b | A | $R_{29}G_{29}B_{29}$ | BLUE CLOSE TO MAGENTA |  |
| 1010b | A# | $R_{2A}G_{2A}B_{2A}$ | RED CLOSE TO MAGENTA |  |
| 1011b | B | $R_{2B}G_{2B}B_{2B}$ | MAGENTA CLOSE TO RED |  |
| 1100b | C | $R_{2C}G_{2C}B_{2C}$ | RED |  |

FIG.4

| SET VALUE | PAN LCH(dB) | PAN KCH(dB) | X AXIS |
|---|---|---|---|
| 7Fh | ∞ | 0 | L |
| 7Eh | −37.5 | 0 | |
| 7Dh | −31.5 | 0 | |
| ⋮ | ⋮ | ⋮ | ⋮ |
| 47h | −4.5 | −3 | −1 |
| 3A~46h | −3 | −3 | 0 |
| 39h | −3 | −4.5 | +1 |
| ⋮ | ⋮ | ⋮ | ⋮ |
| 01h | 0 | ∞ | |
| 00h | 0 | ∞ | R |

FIG.5

| SET VALUE | VOLUME(dB) | IMAGE SIZE |
|---|---|---|
| 00~03h | ∞ | +31 |
| 04~07h | −47.95 | +30 |
| 08~07h | −42.49 | +29 |
| ⋮ | ⋮ | ⋮ |
| 38~3Bh | −13.31 | +17 |
| 3C~Fh | −12.19 | +16 |
| 4d~43h | −11.11 | +15 |
| ⋮ | ⋮ | ⋮ |
| 74~77h | −1.13 | +2 |
| 78~78h | −0.18 | +1 |
| 7C~7Fh | 0 | 0 |

FIG.6
| PROGRAM CHANGE | KIND OF MUSICAL INSTRUMENT | IMAGE |
|---|---|---|
| 0 | grand piano |  |
| 1 | brite piano |  |
| 2 | E. grand piano |  |
| ... | ... | ... |
| 125 | helicptr |  |
| 126 | applause |  |
| 127 | gun shot |  |

| PURITY DEGREE | CHARATER |
|---|---|
| -2 | |
| -1 | |
| 0 | |
| 1 | |
| 2 | |
| 3 | |
| 4 | |
| 5 | |
| 6 | |
| 7 | |

TELEPHONE AND METHOD FOR CONVERTING SOUND TO IMAGE AND DISPLAYING ON SCREEN THEREOF

CROSS-REFERENCE TO OTHER APPLICATIONS

This Application is a National Phase of International Application No. PCT/KR02/00563, filed on Mar. 29, 2002, which claims priority from Korean Patent Application No. 2001/17780, filed on Mar. 29, 2001; Korean Patent Application No. 2001/20297, filed on Apr. 9, 2001; Korean Patent Application No. 2001/23259, filed on Apr. 23, 2001; Korean Patent Application No. 2001/60632, filed on Sep. 28, 2001; and Korean Patent Application No. 2001/65013, filed on Oct. 22, 2001.

TECHNICAL FIELD

The present invention relates to a telephone and a method for converting a sound to an image and displaying on a screen thereof, and more particularly, to a telephone and a method for converting a sound to an image and displaying on a screen thereof for displaying a bell sound of a portable phone and a call sound between a caller and a called party on a screen as a color.

BACKGROUND ART

Currently, a mobile communication terminal (hereinafter, referred to as "portable phone") such as a portable phone, a PCS phone, or an IMT-2000 phone has been spreading, and various functions of the portable phone have been introduced.

As a market competition between a manufacturer of the portable phone and a communication service company has increased, research and development through marketability and competition of an additional service has been actively undertaken.

Additional functions of the portable phone include a transmission of a character message, various bell sound services, and a game.

Suppose that a plurality of portable phones having the same call sound, that is, the same bell sound, are located in an adjacent area. When a caller tries to call one of the portable phones, each of the portable phone users should confirm whether his/her own portable phone is being called.

In response to a portable phone user's desire to have a specific bell sound, portable phones capable of selecting various bell sounds by a user have been introduced. Further, a portable phone receives and sets a download of a specific bell sound from a bell sound service provider or directly sets a person's voice as the bell sound.

From the beginning, a buzzer sound of a single channel was generally used for the bell sound. Currently, an MIDI chord bell sound according to an SMAF (Synthetic music Mobile Application Format: data format for multi media contents classification provided from YAMAHA in Japan) such as 4poly YAMAHA MA1, 16poly YAMAHA MA2 (MMF) has been provided.

A color screen such as a full color moving picture, graphics, an animation, etc. is included in 2.5 generation portable phone of a CDMA 2000 1× and 3 generation portable phone of an IMT 2000.

However, a portable phone user can aurally recognize a bell sound or a call sound of a portable phone but can not visibly recognize it.

DISCLOSURE OF INVENTION

Accordingly, the present invention has been made to solve the above-mentioned problems occurring in the prior art. Therefore, it is an object of the present invention to provide a telephone and a method for converting a sound to an image and displaying on a screen thereof capable of displaying a bell sound or a call sound of a telephone such as a portable phone.

It is another object of the present invention to provide a telephone and a method for converting a sound to an image and displaying on a screen thereof capable of improving the marketability of the telephone by displaying a sound as an image in the telephone.

It is another object of the present invention to provide a telephone and a method for converting a sound to an image and displaying on a screen thereof capable of displaying a called party's sound purity degree and feeling index as a character and a color image.

In order to achieve the above object, the present invention provides a telephone comprising:
a receiver for receiving a call signal;
a storage section for storing call sound information;
a call sound output section for outputting the call sound information;
a color display device for displaying a color image; and
a controller for reading the call sound information from the storage section when the receiver receives the call signal, the controller controlling an operation of the call sound output section in response to the read call sound information, the controller analyzing the read call sound information to acquire sound analyzed information, and the controller displaying a corresponding call sound image in response to the sound analyzed information on the color display device.

Preferabley, the call sound information is synthetic sound mobile audio 2 format information, the controller acquires sound analyzed information having a program change, a channel volume, a panorama, a note, and a channel message among the synthetic sound mobile audio 2 format information, and converts the synthetic sound mobile audio 2 format information into image information having an image shape, an image size, an x axis location, a color, a y axis location, and a numeral in response to the sound analyzed information.

More preferably, the call sound information is voice information, the controller Fourier-transforms the voice information, acquires a pitch (fundamental frequency), a format frequency, energy of each formant frequency from the Fourier-transformed information as sound analyzed information, and converts the Fourier-transformed information into image information having an image color, the number of images, a y axis location, an image, location in response to the sound analyzed information.

Also. there is provided a telephone comprising:
a receiver for receiving a call signal;
a storage section for storing call sound information;
a call sound output section for outputting a call sound;
a gradation display device including an illuminating unit and for displaying gradation information; and
a controller for reading the call sound information from the storage section when the receiver receives the call signal, the controller controlling an operation of the call sound output section in response to the read call sound information, the controller analyzing the read call sound information to acquire sound analyzed information, and the controller displaying a corresponding illuminating color of the illuminating unit in response to the sound analyzed information on the gradation display device.

Further, there is provided a telephone comprising:

a handset for inputting/outputting a call sound signal;

a transceiver for transmitting/receiving the call sound signal;

a color display device for displaying a color image; and a controller for detecting an input of the traffic signal through the handset or the transceiver, for ouputting or transmitting the input traffic signal through the handset or the transceiver, for analyzing the input traffic sound signal to acquire sound analyzed information, and for displaying a traffic sound signal corresponding to the acquired sound analyzed information on the color display.

Preferably, the controller Fourier-transforms the call sound information in frames, acquires a pitch (fundamental frequency), a formant frequency, energy of each formant frequency from the Fourier-transformed information as sound analyzed information, and converts the Fourier-transformed information into image information having an image color, the number of images, a y axis location, and an image location in response to the sound analyzed information.

More preferably, the controller Fourier-transforms the call sound information in frames to obtain energy of each frame, acquires a pitch (fundamental frequency), a formant frequency, energy of each formant frequency from the Fourier-transformed information as sound analyzed information, judges a speaker's feeling index in response to the sound analyzed information, and displays character information corresponding to the judged feeling index on the color display device.

Most preferably, the controller outputs the speaker's fundamental and reference frequencies according to the energy and pitch, outputs an average energy and a fundamentally average frequency in a predetermined time unit, and judges the speaker's feeling change according to change rates of the average energy and the fundamentally average frequency.

Also, the controller Fourier-transforms the call sound signal in frames to obtain energy of each frame, acquires a pitch (fundamental frequency), a formant frequency, energy of each formant frequency from the Fourier-transformed information as sound analyzed information, judges a speaker's purity degree index in response to the sound analyzed information, and displays character information corresponding to the judged purity degree index on the color display device.

Furthermore, there is provided a sound/image converting method for a call sound in a telephone, wherein the telephone includes a color display device and generates a call sound when a call signal is received or in response to a call key input, the method comprising the steps of:

reading call sound data;

sampling sound analyzing information of a call sound according to a format of the read call sound data;

forming color image data corresponding to the sampled sound analyzing information; and synchronizing the color image data with an out put of the call sound and displaying a color image on the color display device of the telephone.

There is provided a sound/image converting method for a traffic sound in a telephone including a color display device, the method comprising the steps of:

receiving a called party's traffic sound data;

sampling sound analyzing information of a traffic sound from the called party's traffic sound data received;

forming a traffic sound image corresponding to the sampled sound analyzing information; and synchronizing the traffic sound image with an output of the call sound and displaying a color image on the color display device of the telephone.

In an embodiment of the present invention, a traffic sound display image includes a traffic sound image, a feeling index character, and a purity degree character.

BRIEF DESCRIPTION OF DRAWINGS

This invention will be better understood and its various objects and advantages will be more fully apply appreciated from the following description taken in conjunction with the accompanying drawings, in which:

FIGS. 2 through 6 are tables for showing corresponding relationships of each sound analyzed information and image information with respect to a composite call sound of an MA2 format;

FIG. 21 is a view for showing an example of a corresponding relationship of emotional indexes and characters according to an embodiment of the present invention;

FIG. 22 is a view for showing an example of a corresponding relationship of purity indexes and characters according to an embodiment of the present invention;

BEST MODE FOR CARRYING OUT THE INVENTION

Hereinafter, this invention will be described in detail with reference to the drawings.

Figure 1:
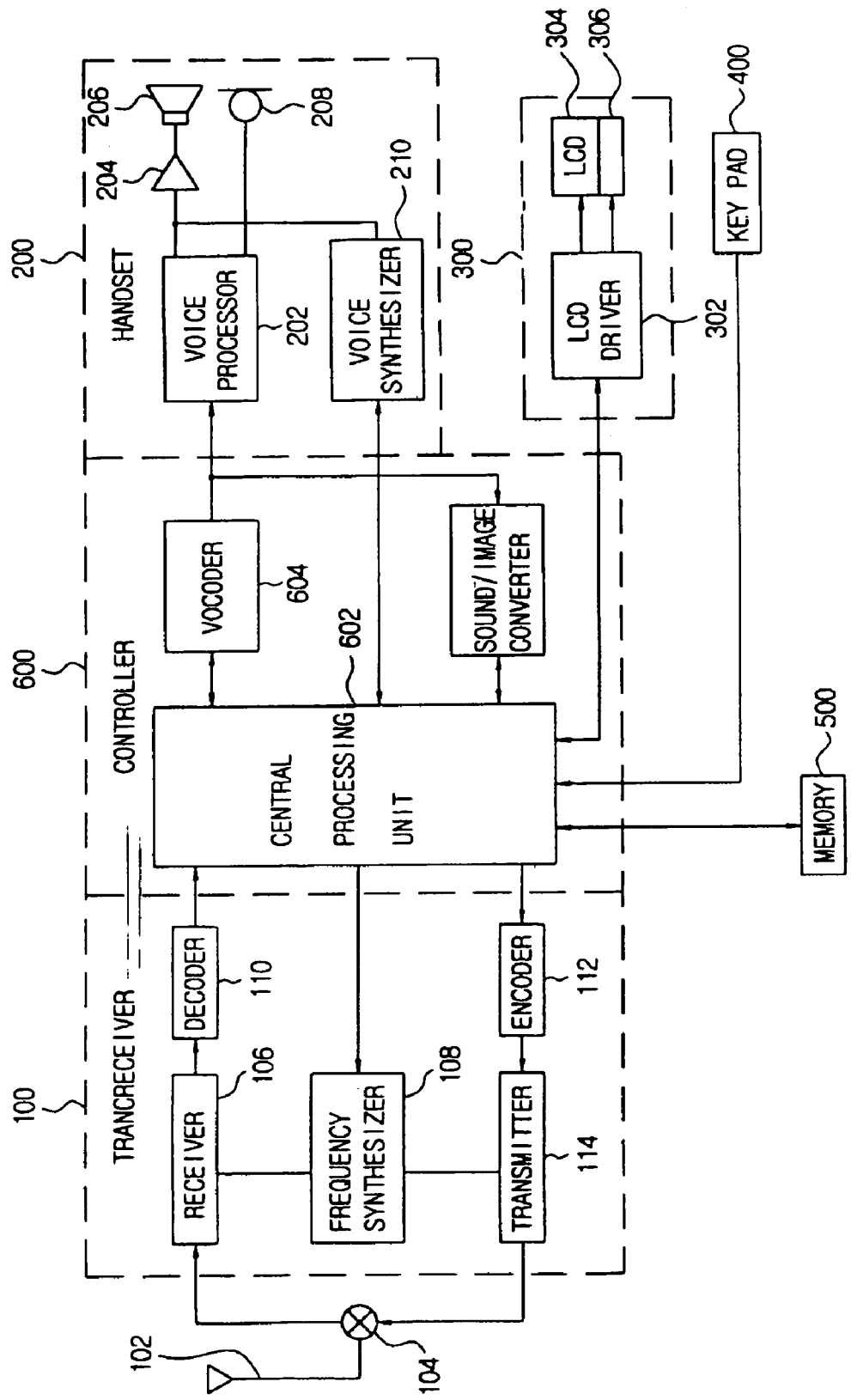
FIG. 1 is a block diagram for showing a configuration of a telephone according to an embodiment of the present invention.

FIG. 1 is a block diagram for showing a configuration of a portable phone according to an embodiment of the present invention. The portable phone includes a transceiver 100, a handset 200, a display device 300, a key pad 400, a memory 500, and a controller 600.

The transceiver 100 receives an RF signal transmitted from a mobile communication base station through an antenna 102 and a duplexer 104 by a receiver 106. The receiver 106 mixes the received RF signal with a frequency signal provided from a frequency synthesizer 108 and extracts a CDMA signal. The CDMA signal is provided to a decoder 110.

The decoder 110 demodulates the CDMA signal from the receiver 106 and restores the demodulated CDMA signal to channel coded data. The decoder 110 decodes the channel coded data by a CDMA decoding algorithm and outputs packet data. The packet data are provided to a controller 600.

An encoder 112 channel-encodes the packet data provided from the controller by a CDMA encoding algorithm and provides the channel-encoded data to a transmitter 114.

The transmitter 114 converts the channel-encoded data from the encoder 112 into a CDMA signal and modulates the CDMA signal. The transmitter 114 mixes the modulated CDMA signal with the frequency signal provided from a frequency synthesizer 108 to generate an RF signal. The RF signal is transmitted to the air through the duplexer 104 and the antenna 102.

The handset 200 converts voice data and ADPCM data provided from the controller 600 into analog voice signals by a voice processor 202. A voice amplifier 204 and a speaker 206 outputs the analog voice signals from the voice processor 202 as a voice.

The voice processor 202 of the handset 200 converts a voice signal inputted through a microphone 208 into digital voice data, namely, ADPCM data and provides the converted digital voice data to the controller 600.

A voice synthesizer 210 of the handset 200 synthesizes call sound data provided from the controller 200 and generates an analog call sound signal. The analog call sound signal is outputted through the voice amplifier 204 and the speaker 206 as a bell sound.

The voice synthesizer 210 includes a voice synthesizing chip (for example, YMU759 chip of YAMAHA Co., Ltd. Japan) which processes call sound data and MIDI call sound data and generates a voice signal. The call sound data are PCM or ADPCM for a voice and the MIDI call sound data are a computer synthesizing sound of an MA1 or MA2 format.

A display device 300 converts image data provided from the controller 600 into LCD drive data by an LCD driver 302. The LCD drive data are provided to an LCD panel 304 and are displayed through the LCD panel as an image.

The LCD panel 304 displays the image using a gradation or color display method.

In the gradation display method, a character, a number, and an icon, etc., are displayed on a screen, and a color illumination unit 306 is used. The color illumination unit 306 provides a color illumination to a crystal liquid panel by red and green lamps, or red, green, and blue lamps, for example, a combination of light emitting diodes.

A key pad of a general portable phone is used for a key pad 400. The key pad 400 provides a key input signal to the controller 600. The key pad 400 selects a sound/image conversion and display function, downloads call sound data, or performs a function key input for selecting an image.

A memory 500 includes a fresh memory, an random access memory (RAM), and an read only memory (ROM).

Downloaded call sound data are stored in the fresh memory. An operating program of the portable phone is stored in the ROM.

The controller 600 includes a central processing unit 602, a vocoder 604, and a sound/image converter 606.

The central processing unit 602 includes a micro computer or an interface circuit and executes the operating system of the portable phone.

The vocoder 602 receives the packet data provided from the transceiver 100. The vocoder 602 decodes compressed data by a Qualcomm code Exitation linear prediction (QCELP) decoding algorithm and provides extended sound data to the voice processor 202 of the handset 200. The vocoder 602 compresses voice data provided from the handset 200 by a QCELP encoding algorithm and generates the packet data. The packet data is provided to the encoder 112 of the transceiver 100.

In a QCELP algorithm, formant frequency information and pitch information of a voice signal are extracted, compressed, and encoded as feature information. In a decoding operation, a voice signal similar to an original sound is generated based on received formant information and pitch information.

The sound/image converter 606 receives call and traffic sound data and generates corresponding image data by a sound/image conversion algorithm according the present invention, and provides the image data to the display device 300 through the central processing unit 602.

The sound/image conversion algorithm according to the present invention will now be described as follows.

1. Image Conversion Algorithm of Composite Call Sound Having MA2 Format

Sequence data of an MA2 format provided by YAMAHA Co., Ltd. are formed by a repetition of duration data of 1~2 bytes and event data of 2 through N bytes.

The event data are divided into a control message, a note message, an NOP message, and an exclusive message according a data type.

The control message includes a channel code, a control identification (ID) a type code, and a set value, etc., in the second and third bytes. The control message is divided into a program change, an octave shift, a channel volume, a panorama (panpot), and an expression according to the type code.

The program change is information which sets a musical instrument tone of a corresponding channel to any one among 128 kinds of musical instrument tones. The octave shift is information which sets an octave shift amount of a corresponding channel to any one among 10 kinds of shift mounts. The channel volume is information which sets a volume of the corresponding channel to any one grade among 32 volume grades. The panorama (panpot) sets each decibel value of L and R stereo sound source in a stereo sound field to any one grade among 44 grades. The expression is information which changes a volume of the corresponding channel while reproducing music.

The note message includes a channel code, an octave code, a note code, and a gate time code. The octave code includes octave information of 4 grades having low, middle low, middle high, and high. The note code has 12 musical scale information. The gate time code has sound length information of a corresponding sound in a set musical scale.

The exclusive message includes a head code of 2 bytes, a message size of 1 byte, a maker ID of 1 byte, a format ID of 1 byte, data of n bytes, and a data end of 1 byte. The exclusive message sets tone data or directly has access control information.

Accordingly, an image conversion of a MIDI call sound corresponds the above musical information to the following image information. A Y axis of a liquid crystal display screen corresponds to a sound height, that is, a frequency of a sound. An X axis of the liquid crystal display screen corresponds to a decibel value of a stereo sound source. Sound analyzing information and image information are matched with each other as indicated in the following table 1.

FIGS. 2 through 6 are tables for showing corresponding relationships of each piece of sound analyzed information and image information with respect to a composite call sound of an MA2 format.

The central processing unit 602 judges whether the read call sound data are call sound data of MA2 which a user has set among various call sound data which the user has downloaded and stored in the memory 500 (step S104). When the read call sound data are not the call sound data of MA2, the central processing unit 602 recognizes the read sound data as voice call sound data and a voice call sound process routine is performed (step S105). When the read call sound data are the call sound data of MA2, the image conversion algorithm of a composite call sound having an MA2 format is performed and sound analyzing information is extracted from the call sound data (step S106). Then, an image corresponding to the extracted sound-analyzing information is formed (step S108).

TABLE 1

| | MA2 DATA | SOUND INFORMATION | IMAGE | REFERENCE |
|---|---|---|---|---|
| NOTE MESSAGE | OCTAVE, NOTE VALUE | SOUND HEIGHT | Y AXIS LOCATION, COLOR | FIGS. 2 and 3 |
| | GATE VALUE | SOUND LENGTH | IMAGE DISPLAY TIME | |
| CONTROL MESSAGE | PANORAMA | STEREO SOUND SOURCE DECIBEL | X AXIS LOCATION | FIG. 4 |
| | CHANNEL VOLUME | SOUND PRESSURE | IMAGE DISPLAY AREA | FIG. 5 |
| | PROGRAM CHANGE | INSTRUMENT NUMBER | IMAGE KINF | FIG. 6 |
| EXCLUSIVE MESSAGE | VOICE DATA | CHORD NUMBER | IMAGE NUMBER | 4POLY-4IMAGE 16POLY-16IMAGE |

With reference to FIG. 2, 4 octave ranges correspond to 4 brightness values, respectively. With reference to FIG. 3, each musical scale in a middle high octave range has corresponding RGB value and color. With reference to FIG. 4, panorama (panpot) values having LR stereo values correspond to coordinate values on an X axis of a screen. With reference to FIG. 5, channel volumes correspond to image sizes. With reference to FIG. 6, program change values correspond to image shapes.

Figure 7:
FIG. 7 is a view for showing an image of a composite call sound in a portable phone according to an embodiment of the present invention.

FIG. 7 is a view for showing an image of a composite call sound in a portable phone according to an embodiment of the present invention. With reference to FIG. 7, when 4poly synthetic call sound is formed by an ensemble sound of 4 channel musical instruments having a drum, a grand piano, a saxophone, and violin, images corresponding to each musical instrument channel are displayed by a stereo sound field in a Y axis coordinate of a screen as a sound field feeling. Sizes of a color and an image shape with respect to sound frequency components in each channel are differently displayed according to a frequency height at the Y axis of the screen.

The image is displayed only while a sound length (duration) of each MIDI sound lasts.

Figure 8:
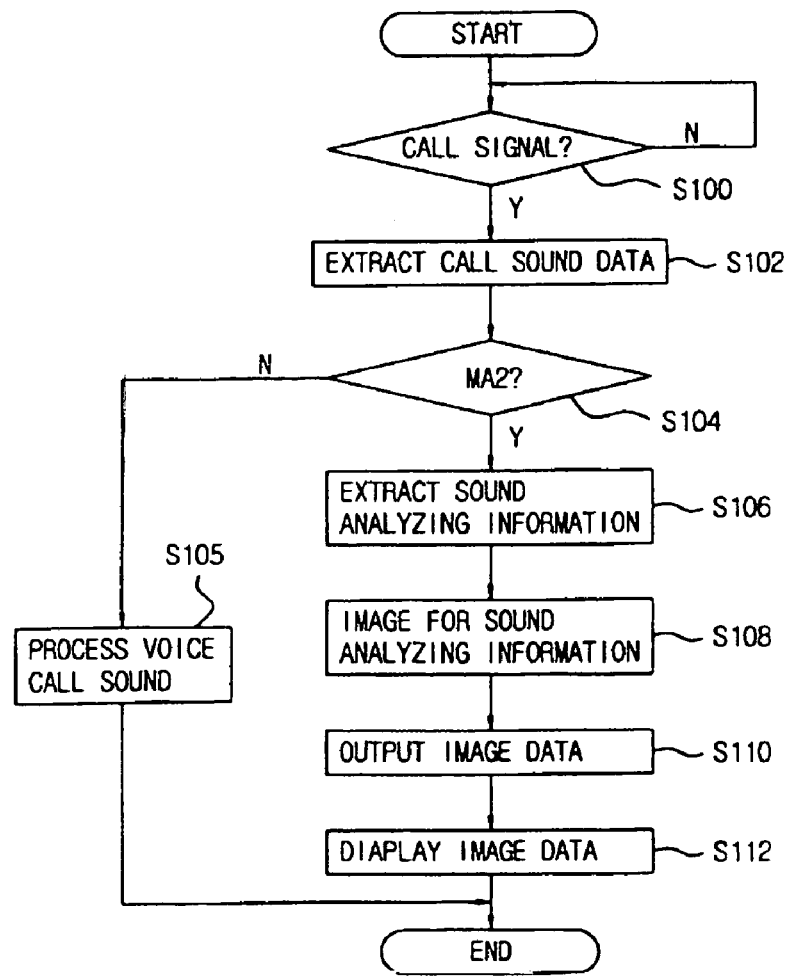
FIG. 8 is a flow chart for illustrating a sound/image converting method for a composite call sound in a telephone according to an embodiment of the present invention.

With reference to FIG. 8, a central processing unit 602 checks whether a call signal is received or a traffic key is inputted (step S100). When the call signal is not received and the traffic key is not inputted, a traffic standby status is maintained.

When checking occurs in step S100 that the call signal is received or the traffic key is inputted, the central processing unit 602 reads call sound data from the memory 500 and provides the read call sound to the voice synthesizer 210 and sound/image converter 606. That is, the central processing unit 602 reads call sound data which a user sets among various call sound data downloaded and stored in the memory (step S102).

When the formed image data is provided to the central processing unit 602 (step S110), the central processing unit 602 converts image data into RGB data. The central processing unit 602 synthesizes the RGB data with other display data to generate image data. The image data are provided to an LCD driver 302 and are displayed through an LCD panel 304 (step S112).

The central processing unit 602 controls the LCD panel 304 to display the image data in synchronism with an output of a call sound.

The sound/image converter 606 previously forms the tables shown in FIGS. 2 through 6 as a look-up table and generates RGB data of corresponding image according to an addressing of the sound analyzing information.

2. Image Conversion Algorithm of Voice Call Sound

A person's voice or a natural sound is recorded as ADPCM or PCM data and the ADPCM or PCM data are stored in a memory. A voice call sound information is formed as digital data sampled in a time axis so that it is outputted as a call sound when responding to a call signal.

A YMU759 chip of YAMAHA Co., Ltd. has a function which reproduces a voice call sound formed by ADPCM data and outputs a voice.

Figure 9:
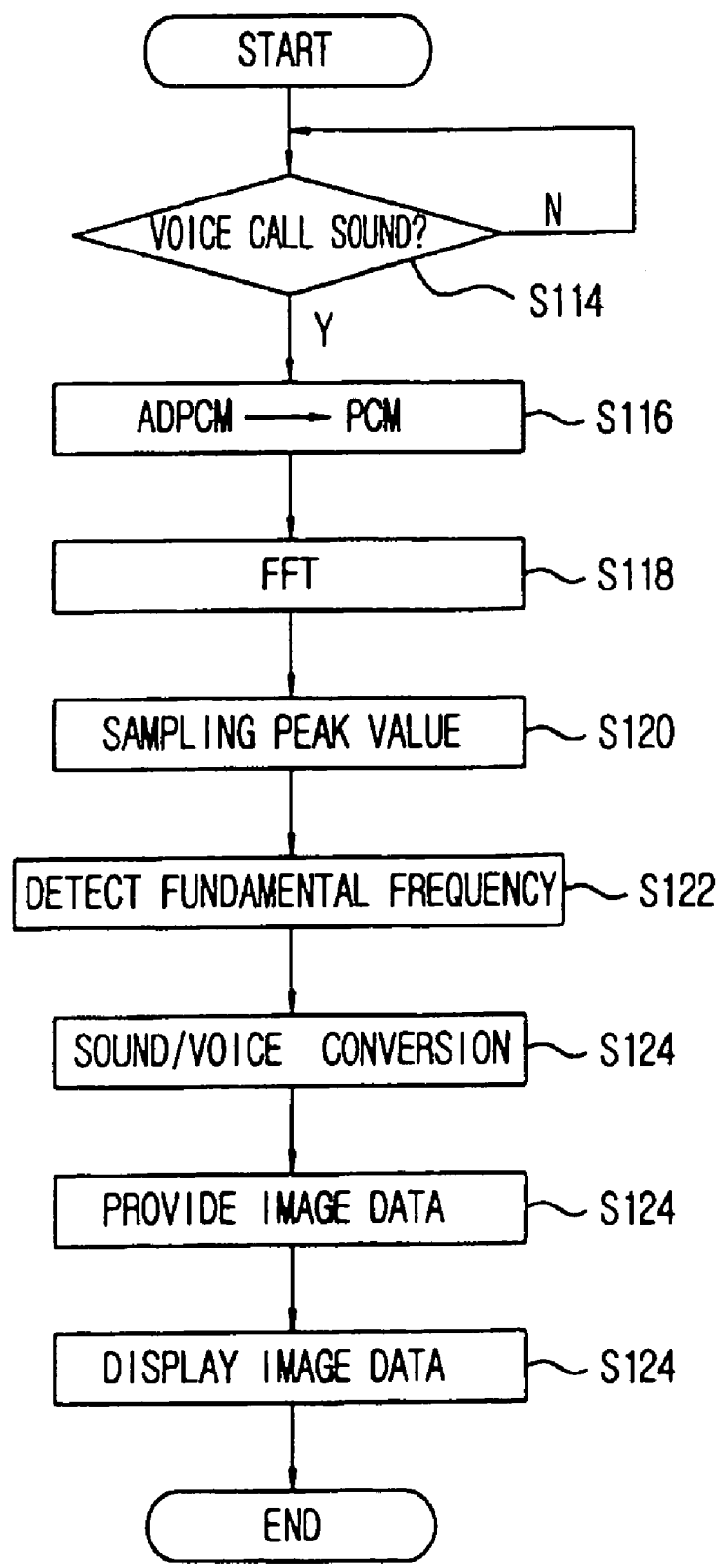
FIG. 9 is a flow chart for illustrating a sound/image converting method for a voice call sound in a telephone according to an embodiment of the present invention.

With reference to FIG. 9, when a voice call sound is received, the sound/image converter 606 receives and converts call sound information of ADPCM data into PCM data of 16 bits (step S116).

The converted PCM data is fast Fourier transformed in frames and is converted into frequency data (step S118).

Peak values and a pitch (fundamental frequency) of the frequency data are obtained every frame. The peak values of the frequency data is filtered by a filtering algorithm. The filtered peak values are classified in an order of energy magnitude and filtered to the predetermined number smaller than 30(step S120). Each of the filtered peak values of the frequency data includes a formant frequency of a voice signal of a corresponding frame. A pitch is detected from a frequency area to obtain a fundamental frequency (step S122). The fundamental frequency is sound/image converted by a sound/image conversion algorithm to obtain a visible frequency (step S124).

The sound/image conversion algorithm in step S124 is defined by the following equation 1.

Equation 1

$$F = F_l \times 2^{x^*} \quad (1)$$

$$B_F \propto x$$

$$x = \log_2\left(\frac{F_i}{F_l}\right) + C,$$

where, F is a visible frequency to be obtained, $F_1$ is a reference visible frequency, an integer party of x is an octave value, $B_F$ is a brightness of a color, x is a party down a decimal point and a sound field value in one octave, $f_i$ is a sampled reference audible frequency, $f_1$ is a reference audible frequency, and C is a constant and a real number which ranges $0 \leq C \leq 1$.

For example, the reference audible frequency $f_1$ is 329.6 Hz corresponding to 'mi' of 4 octave. The constant C is 0.29 by a reference frequency corresponding to 'red'. When a minimal audible frequency $f_1$ and a minimal visible frequency $F_1$ are set to 20 Hz and 350 Hz, respectively, a visible frequency is 441 THz, a brightness of a color to be obtained is 4.33(43.3%) proportional to the calculated x value according the equation 1.

When a color corresponding to the visible frequency obtained in step S124 and image size information corresponding to energy of each frequency are formed as image data and the formed image data are provided to the central processing unit 602 (step S126), the central processing unit 602 converts image data into RGB data. The central processing unit 602 synthesizes the RGB data with another display data to generate image data. The image data are provided to an LCD driver 302 and are displayed through an LCD panel 304 (step S128).

The central processing unit 602 controls the LCD panel 304 to display the image data in synchronism with an output of a voice call sound.

Figure 10:
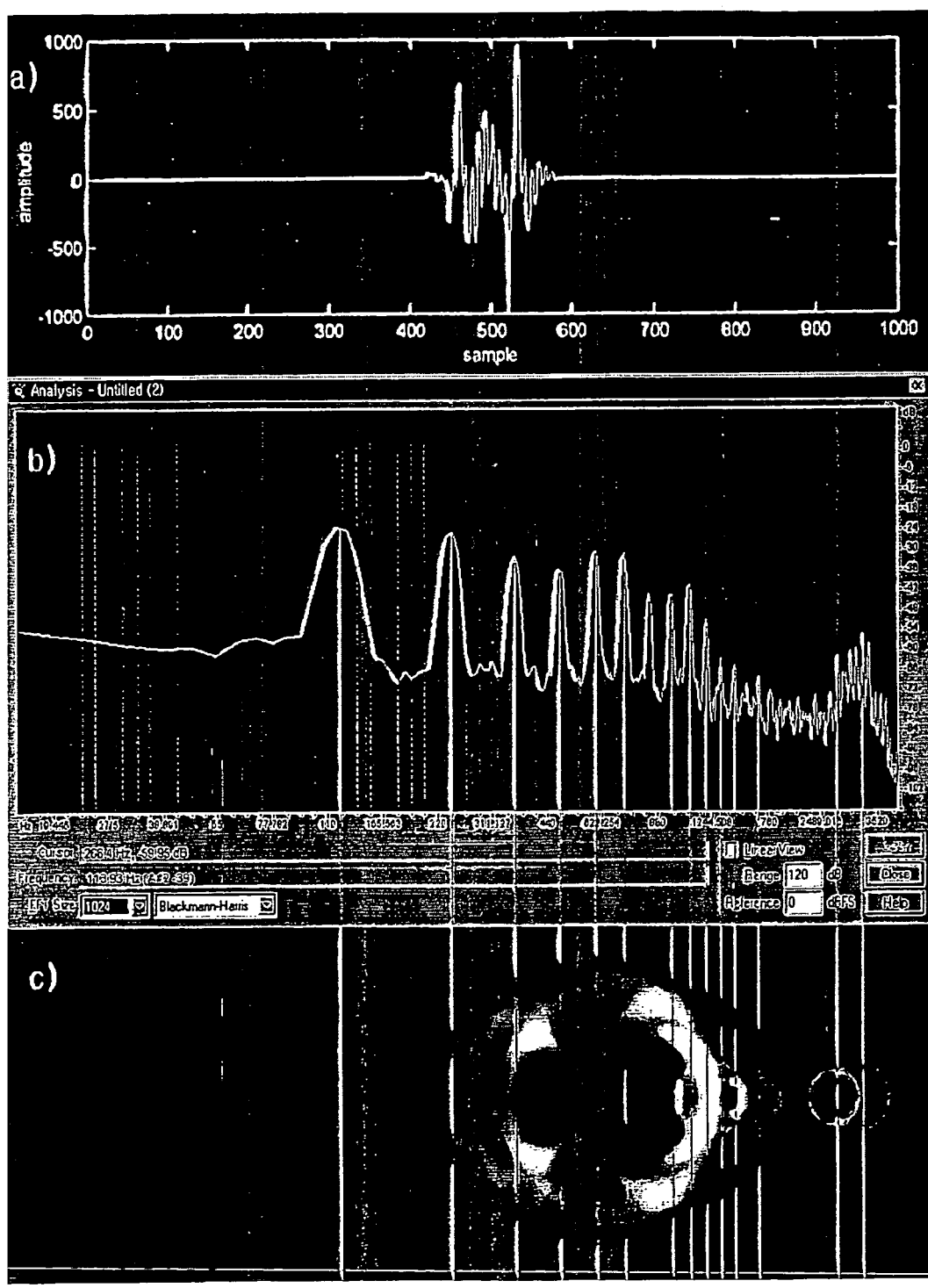
FIG. 10 is a view for showing a corresponding relationship of each sound analyzed information and image information with respect to a voice call sound and an image display thereof.

FIG. 10 is a view for showing a corresponding relationship of each piece of sound analyzed information and image information with respect to a voice call sound and an image display thereof. With reference to FIG. 10, FIG. 10a) shows a sampled voice signal, FIG. 10b) shows a frequency spectrum of a fast Fourier transformed voice signal, and circle images corresponding to peak values of frequency data are displayed on a screen in FIG. 10c).

In FIG. 10c), each size of circles corresponding to peak values of frequency data is proportioned to the energy of each frequency. A color of each circle is determined by the equation 1. Parts in which circles overlap with each other indicate that colors of each circle are mixed.

Figure 11:
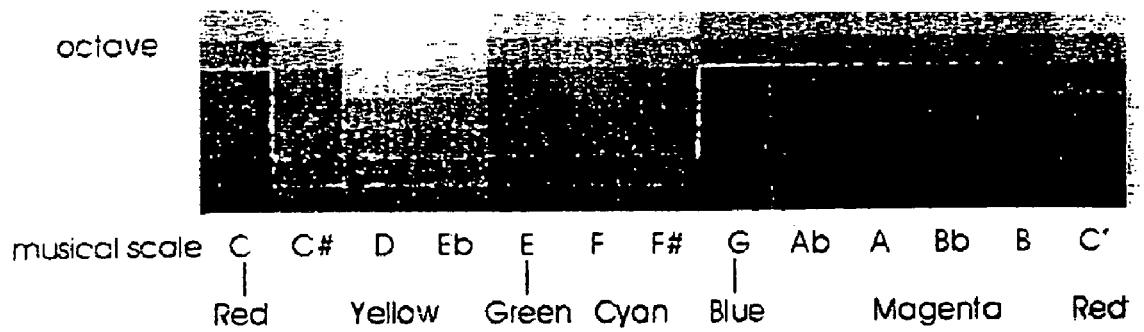
FIG. 11 is an orthogonal color coordinate system for showing colors corresponding to each audio frequency when converting an audio frequency into a visible frequency according to an embodiment of the present invention.

A color corresponding to each audible frequency has a color shown in the color coordinate system of FIG. 11 according to an octave and a musical scale.

FIGS. 12 through 18 are views for showing various image display statuses of a call sound according to an embodiment of the present invention.

Figure 12:
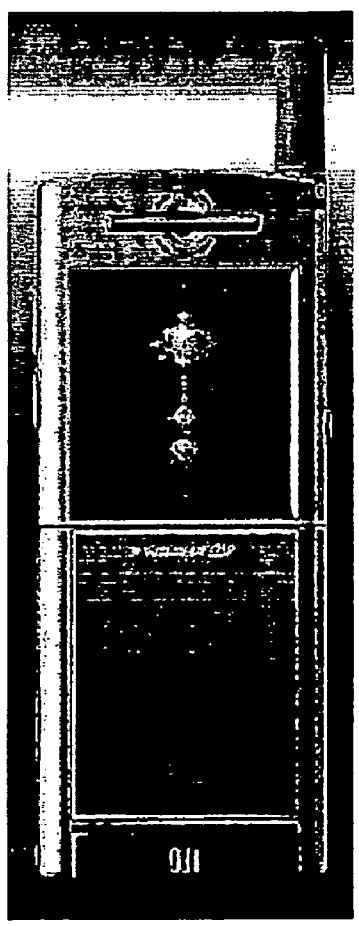
FIGS. 12 through 18 are views for showing various image display statuses of a call sound according to an embodiment of the present invention.
Figure 13:
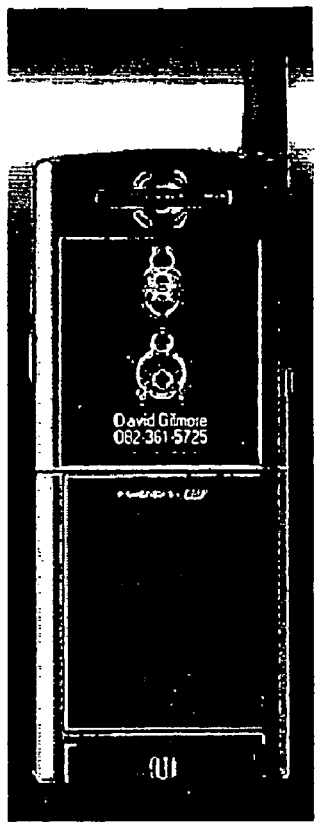

In FIGS. 12 and 13, images corresponding to each sound frequency are arranged corresponding to a y axis of a screen and are displayed as areas proportional to energy amplitude of each sound frequency.

Figure 14:

In FIG. 14, mixed colors of all frequencies are displayed from a center of a screen. The mixed colors are displayed to be radially progressed to an edge of the screen as time goes by.

Figure 15:
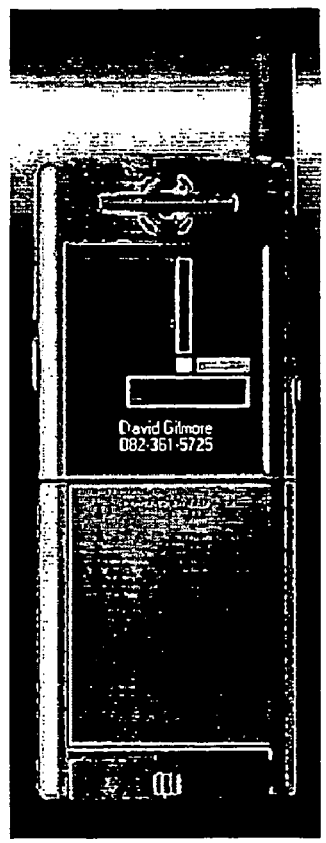

FIG. 15 shows a combination of squares having different areas according to energy magnitude of each sound frequency to be displayed as an image forming a total of a screen by a Mondrian picture form.

Figure 16:

FIG. 16 shows sounds of 4 octaves on a sound/color conversion system circle (radial circle coordinate which corresponds a sound to a color). The lowest octave is displayed at a square band of an outer most side. The highest octave is displayed at a square band of an inner most side. A musical scale of each sound is displayed as a sound corresponding to a square band.

Figure 17:
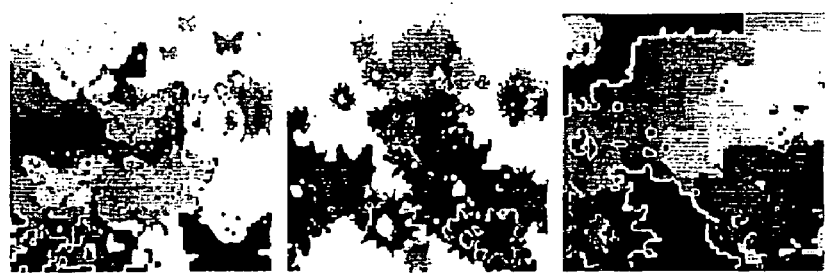

In FIG. 17, an image such as a butterfly, a flower, and a star having a color corresponding to a musical scale of a sound to be displayed is displayed at a random coordinate. A previously displayed image does not disappear and the next displaying image overlaps with the previously displayed image.

Figure 18:

In FIG. 18, an image of a regular triangle having a color corresponding to a musical scale of a sound.

Furthermore, various forms such as a color bar form and a mosaic form can be used without departing from the spirit and scope of the invention.

Therefore, a portable phone user takes pleasure in a bell sound not only aurally but also visibly by a color image which rhythmically changes on a liquid crystal panel according to the bell sound.

3. Color Display of Bell Sound of Portable Phone According to Color Illuminating Unit A portable phone having a color liquid crystal panel was described in the embodiment. However, in a portable phone having a gradation display liquid crystal panel, the bell sound can be visibly displayed.

That is, the portable phone includes a color illumination unit 306. The color illumination unit 306 includes illumination sources having at least two different colors. The color illumination unit 306 provides a color illumination to the liquid crystal panel 304. For example, the color illumination unit 306 outputs the color illumination by a combination of a red light emitting diode, a green light emitting diode, and a blue light emitting diode.

Figure 19:
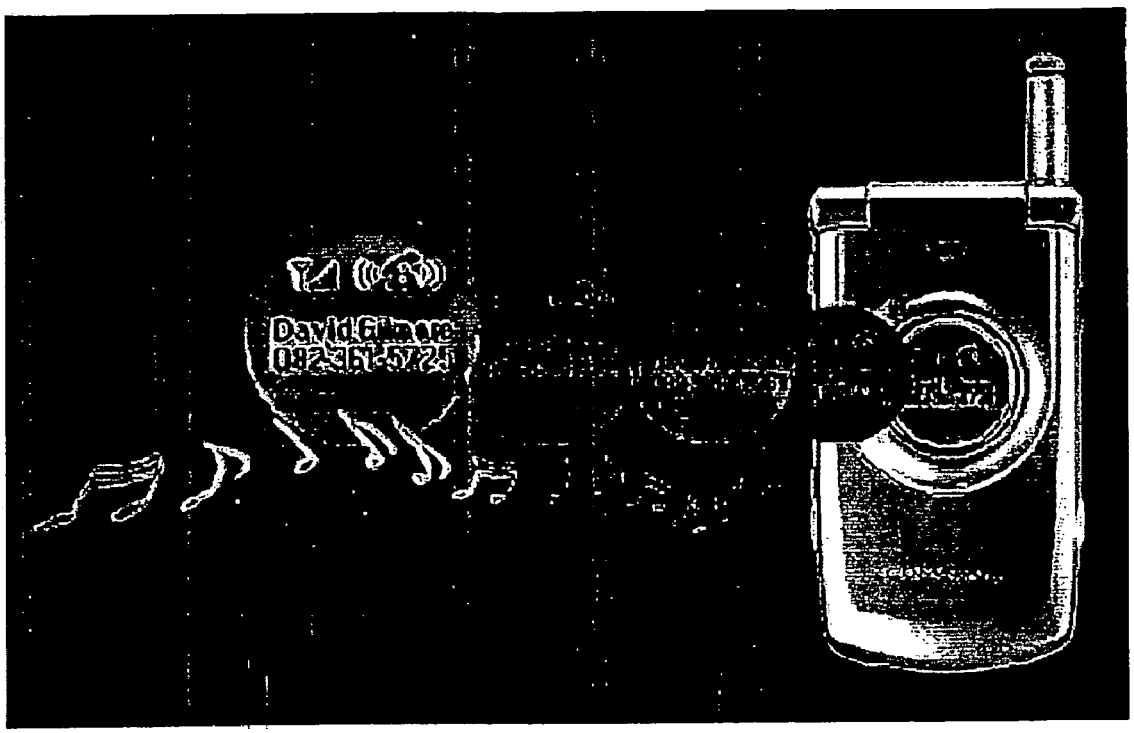
FIG. 19 is a view for displaying the call sound by a change of a color illumination of a liquid crystal panel according to an embodiment of the present invention.

Accordingly, in an embodiment of the present invention, in driving a color light emitting diode of the color illumination unit 306, in response to each gain information of RGB value corresponding to each sound obtained by the algorithm, a brightness of each color light emitting diode is controlled. Thus, in response to the bell sound, as shown in FIG. 19, an illumination color is outputted to be rhythmically changed to 65000 colors on an LCD display window.

4. Image Conversion Algorithm of Traffic Sound

Figure 20:
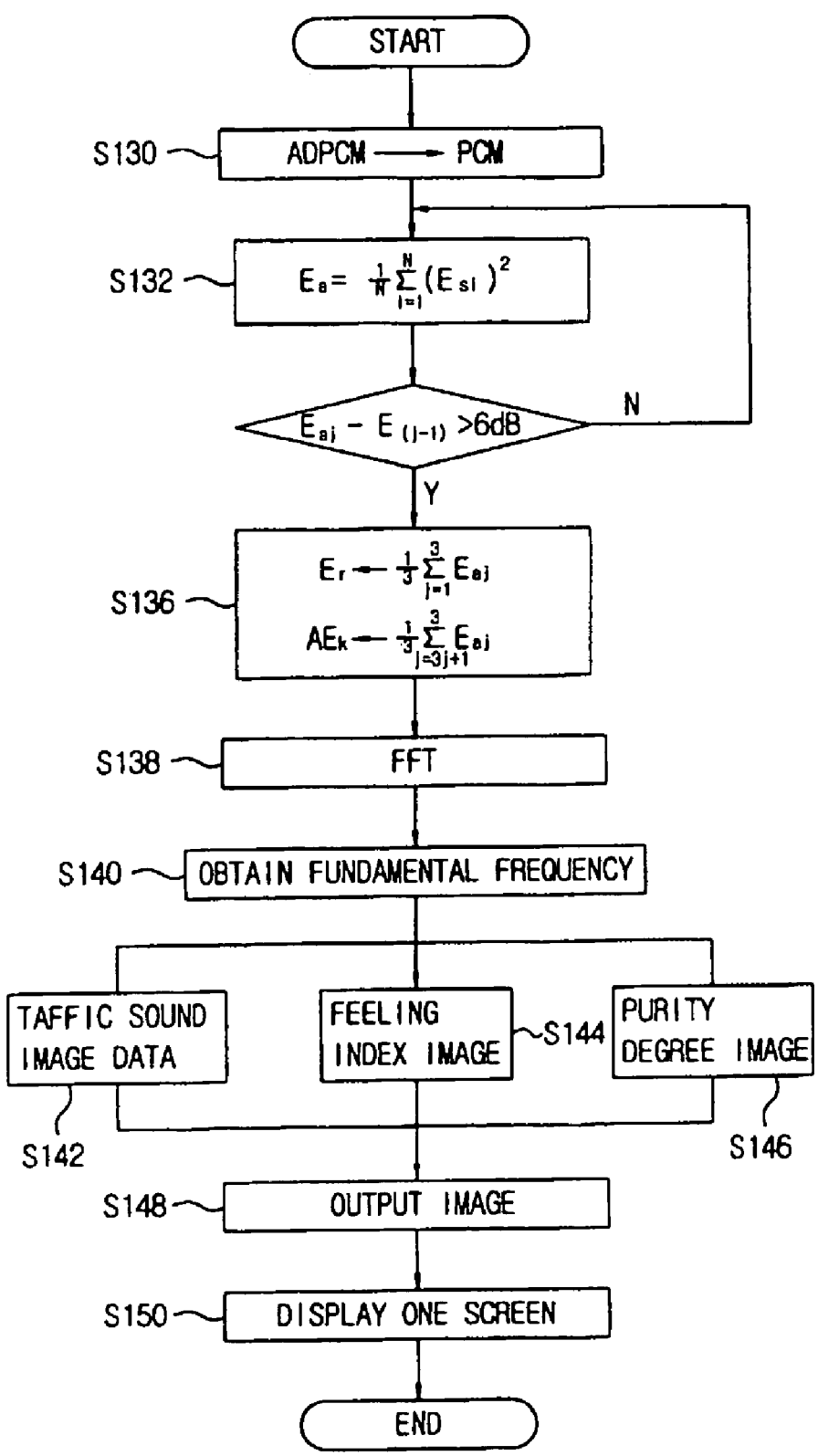
FIG. 20 is a flow chart for illustrating a sound/image converting method for a traffic sound in a telephone according to an embodiment of the present invention.

As shown in FIG. 20, according to an image conversion display of the traffic sound, a called party's voice in a portable phone is outputted as an image and simultaneously, a feeling status and a purity according to the called party's voice analysis are expressed as characters.

The vocoder 604 decodes data and generates ADPCM data. The ADPCM data are provided to a voice processor 202.

The sound/image converter 606 samples output data of the vocoder 604 in frames to generate 1024 samples and converts them into PCM data (step S130).

An average energy Ea $$(E_a = \frac{1}{N}\sum_{i=1}^{N}(E_{si})^2)$$

by frames is obtained (step S132). Es is energy of each sample value, and N is the total sample number (1024) in a frame.

It is judged whether an average energy $E_{aj}$ of a current frame minus an average energy $E_{a(j-1)}$ of a previous frame is greater than 6 db (step S134).

When a traffic sound is present, an average energy of the initial 3 frames is obtained to calculate a reference energy $E_r$. Then, an average energy $AE_k$ of the next 3 frames is obtained (step S136).

Sample values of each frame are fast-Fourier-transformed (step S138). A pitch, that is, a fundamental frequency $f_f$ is obtained based on Fourier-transformed frequency data using a known algorithm which obtains a pitch (step S140).

4-1. Voice Image Formation

A fundamental frequency $f_f$ is extracted. A circle proportional to an amplitude of energy $E_{ff}$ of the extracted fundamental frequency $f_f$ is arranged at a center of a voice screen area. A waveform at a time axis of a voice overlaps a circumference of a circle to output a voice image. A base color of a screen is displayed as a color corresponding to the fundamental frequency $f_f$. The color corresponding to the fundamental frequency $f_f$ is acquired using the equation 1.

As mentioned above, traffic sound image data are formed (step S142). 4-2. Feeling Index Image Formation When a person is excited, the person speaks in a loud voice according to a feeling index to thereby change a volume and the fundamental frequency. According to an embodiment of the present invention, the feeling index is calculated based on energy values and fundamental frequencies by frames.

A reference frequency $f_r$ is determined using fundamental frequencies $f_{f1}$, $f_{f2}$, and $f_{f3}$ of initial 3 frames. The reference frequency $f_r$ is determined as an average fundamental frequency $f_{fa}$ of the initial 3 frames.

The average fundamental frequency is determined as an average of two fundamental frequencies except a fundamental frequency having a maximal value among the fundamental frequencies of the initial 3 frames.

When the determined average reference frequency is within the range from 80 Hz to 600 Hz, the determined average reference frequency is determined as a reference frequency.

When the determined average reference frequency is beyond the range from 80 Hz to 600 Hz, the greater one of the two fundamental frequency is determined as the reference frequency $f_r$.

When the reference energy $E_r$ and the reference frequency $f_r$ are determined, an average energy $AE_k$ and an average fundamental frequency $f_{ak}$ are obtained in the next 3 frames.

A change rate (E rate) of an average energy obtained with respect to the reference energy $E_r$ is obtained, that is, E rate=$AE_k/E_r$.

A change rate (f rate) of an average fundamental frequency obtained with respec to the reference frequency $f_r$ is obtained, that is, f rate=$f_{ak}/f_r$.

Feeling indexes of 10 stages are determined as shown in table 2 according to the change rate (E rate) of an average energy and the change rate (f rate) of an average fundamental frequency.

Figure 21:
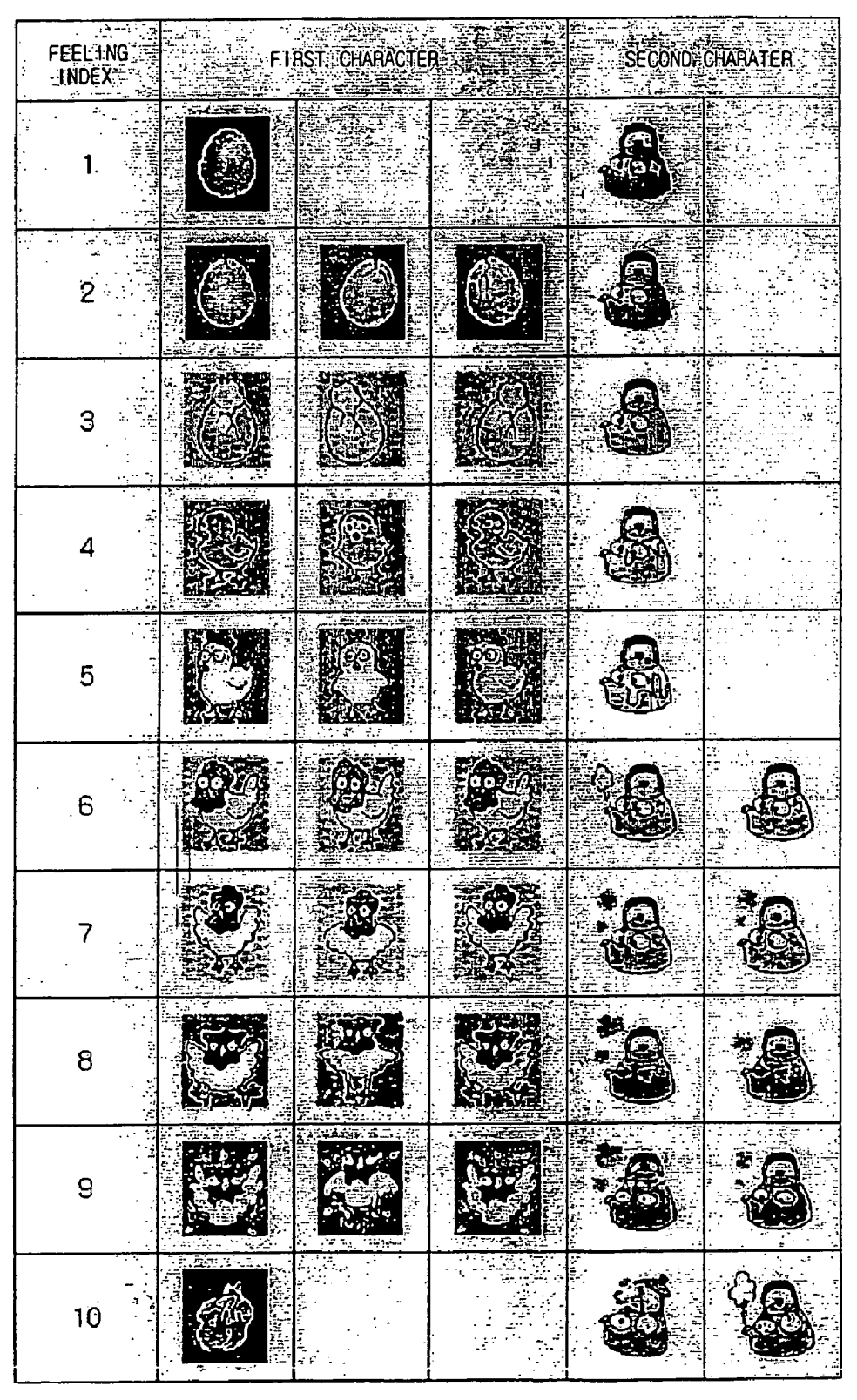

When the feeling indexes are determined, as shown in FIG. 21, character data corresponding to the feeling indexes are read to form an image (step S144).

A kind of feeling index character can be determined by a user's selection.

TABLE 2

| FEELING INDEX | ENERGY CHANGE RATE | FREQUENCY CHANGE RATE |
|---|---|---|
| 10 | GREATER THAN 13 | 1.2~3 |
| 9 | 11~13 | |
| 8 | 9~11 | |
| 7 | 7~9 | |
| 6 | 6~7 | 0.8~2 |
| 5 | 5~6 | |
| 4 | 4~5 | |
| 3 | 3~4 | |
| 2 | 0.7~3 | 0.7~1.5 |
| 1 | 0~0.7 | 0.1~1.2 |

4-3. Purity Index Image Formation

In an embodiment of the present invention, the purity of a sound is displayed proportional to a chroma of a color. That is, a clear sound is displayed close to one fundamental frequency. An impure sound has a fundamental frequency and a harmonic frequency.

Accordingly, in a frequency spectrum per frame, the clear sound has a sampled low frequency. The impure sound has a sampled high frequency. The number of corresponding colors becomes larger in each frequency by the equation 1. The more a mixture thereof, the smaller a chroma of a mixed color becomes.

RGB data $f_1$ (RGB), $f_2$ (RGB), $f_3$ (RGB), . . . of sampled peak values per frame are obtained by the equation 1. RGB data are multiplied by energy value of each peak as a gain to obtain a sum of RGB so that a total RGB value is obtained every frame.

$$T(RGB)=e_1f_1+e_2f_2+e_3f_3+\ldots$$

Energy value is regulated as a value from 0 to 1.

A total RGB value has chroma information of a corresponding frame indicating all colors corresponding to each frequency are mixed with each other. Accordingly, a maximal value (MAX) and a minimal value (MIN) among each R value, each G value, and each B value are obtained from the total RGB value. A sum (SUM) and a difference (DIF) of the maximal value (MAX) and the minimal value (MIN) are obtained. The sum (SUM) is divided by 510 to obtain a luminance (LUM).

When the maximal value (MAX) and the minimal value (MIN) are identical with each other, a chroma is 0.

When the luminance (LUM) is equal to or greater than 0.5, the chroma is determined by a value which is obtained by dividing the difference (DIF) by the sum (SUM). When the luminance (LUM) is less than 0.5, the chroma is determined by a value which is obtained by dividing the difference (DIF) by (510−SUM).

As shown in table 3, purity indexes of 10 grades are expressed corresponding to chromas of 10 grades.

TABLE 3

| CHROMA | PURITY DEGREE INDEX |
| --- | --- |
| 0~0.1 | −2 |
| 0.1~0.2 | −1 |
| 0.2~0.3 | 0 |
| 0.3~0.4 | 1 |
| 0.4~0.5 | 2 |
| 0.5~0.6 | 3 |
| 0.6~0.7 | 4 |
| 0.7~0.8 | 5 |
| 0.8~0.9 | 6 |
| 0.9~1.0 | 7 |

Figure 22:
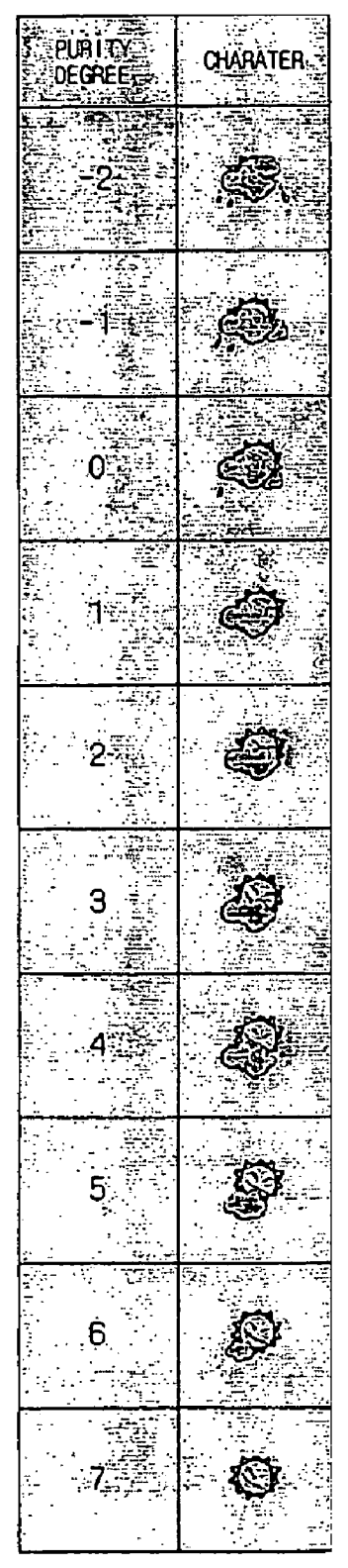

When a purity index is determined, as shown in FIG. 22, character data corresponding to the purity index are read to form purity degree image data (step S146). A kind of a character to be displayed can be determined by a user's selection.

When a traffic sound image, a feeling index image, and a purity degree image are formed, the sound/image converter 606 provides the traffic sound image, the feeling index image, and the purity degree image to the central processing unit 602 (step S148). The central processing unit 602 synthesizes the traffic sound image, the feeling index image, and the purity degree image from the sound/image converter 606 to form one display screen. The one display screen is displayed on the liquid crystal panel as shown in FIGS. 20 and 21.

Figure 23:
FIGS. 23 and 24 are views for showing examples of displayed images with respect to the call sound according to an embodiment of the present invention.

With reference to FIG. 23, in a traffic sound display area, a called party' voice waveform having a circle shape is displayed on bright violet corresponding to a fundamental frequency (5 octave B musical scale) ground. A character corresponding to a feeling index 7 is displayed in a feeling index display area. A character corresponding to a purity degree 0 is displayed in a purity degree index area.

Figure 24:
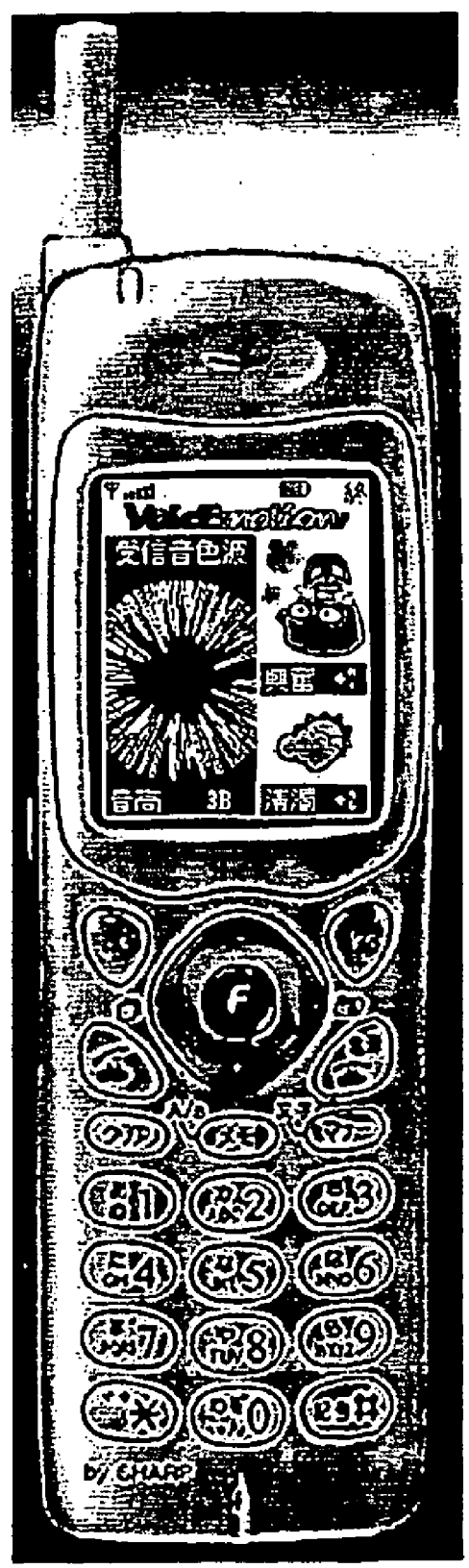

With reference to FIG. 24, in a traffic sound display area, a called party' voice waveform having a circle shape is displayed on dark violet corresponding to a fundamental frequency (3 octave B musical scale) ground. A character corresponding to a feeling index 7 is displayed in a feeling index display area. A character corresponding to a purity degree +2 is displayed in a purity degree index area.

A sound waveform of FIG. 24 is greater than that of FIG. 23. Accordingly, a user can visibly see the called party's volume magnitude. Luminances of FIGS. 24 and 25 are different from each other according to a difference of the 5 octave and 3 octave. The user can recognize whether the call party's current feeling is in an excited or quiet state. The user can recognize whether the called party's voice is clear or impure through a character and an index.

5. Another Example of an Image Conversion of a Traffic Sound

Formant frequency information and pitch frequency information extracted in a decoding operation of the vocoder 104 are provided to a sound/image converter 606. A color corresponding to the formant frequency information and pitch frequency information is obtained by the equation 1. In the case, it is unnecessary for the sound/image converter 606 to perform a fast-Fourier transformation operation.

Further, a sound/image converter transplants a program in a controller and forms it with a software. The sound/image converter can be integrated to a custom semiconductor. A sound/image converter and a voice synthesizer can be hardware embodied by a custom semiconductor.

As mentioned above, according to the present invention, since a call sound of a portable phone, that is, a bell sound is audibly outputted and is visibly displayed on a screen, a newly added function is provided to the portable phone to improve a marketability.

Also, since a called party's voice is displayed as an image, the called party's feeling and voice purity degree are displayed, additional pleasure is provided to the portable phone user, and marketability of the product is improved.

While this invention has been particularly shown and described with reference to particular embodiments thereof, it will be understood by those skilled in the art that various changes in form and details may be effected therein without departing from the spirit and scope of the invention as defined by the appended claims.

The invention claimed is:

1. A telephone comprising:
a receiver for receiving a call signal;
a storage section for storing call sound information;
a call sound output section for outputting the call sound information;
a color display device for displaying a color image; and
a controller for reading the call sound information from the storage section when the receiver receives the call signal, the controller controlling an operation of the call sound output section in response to the read call sound information, the controller analyzing the read call sound information to acquire sound analyzed information, and the controller displaying a corresponding call sound image in response to the sound analyzed information on the color display device
wherein the call sound information is synthetic sound mobile audio 2 formation information, the controller acquires sound analyzed information having a program change, a channel volume, a panorama, a note, and a channel message among the synthetic sound mobile audio 2 format information, and converts the synthetic sound mobile audio 2 format information into image information having an image shape, an image size, an x axis location, a color, a y axis location, and a numerical in response to the sound analyzed information.

2. The telephone as claimed in claim 1, wherein the call sound information is voice information, the controller Fourier-transforms the voice information, acquires a pitch (fundamental frequency), a formant frequency, energy of each formant frequency from the Fourier-transformed information as sound analyzed information, and converts the Fourier-transformed information into image information having an image color, the number of images, a y axis location, and an image location in response to the sound analyzed information.

3. A telephone comprising:
a receiver for receiving a call signal;
a storage section for storing call sound information;
a call sound output section for outputting a call sound;
a gradation display device including an illuminating unit and for displaying gradation information; and
a controller for reading the call sound information from the storage section when the receiver receives the call signal, the controller controlling an operation of the call sound output section in response to the read call sound information, the controller analyzing the read call sound information to acquire sound analyzed information, and the controller displaying a corresponding illuminating color of the illuminating unit in response to the sound analyzed information on the gradation display device wherein the call sound information is synthetic sound mobile audio 2 formation information, the controller acquires sound analyzed information having a program change, a channel volume, a panorama, a note, and a channel message among the synthetic sound mobile audio 2 format information, and converts the synthetic sound mobile audio 2 format information into illumination color control information of the illuminating unit in response to the sound analyzed information.

4. The telephone as claimed in claim 3, wherein the call sound information is voice information, the controller Fourier-transforms the voice information, acquires sound analyzed information having a pitch (fundamental frequency), a formant frequency, energy of each formant frequency from the Fourier-transformed information, and converts the Fourier-transformed information into illumination color control information of the illuminating unit in response to the sound analyzed information.

5. A telephone comprising:
a handset for inputting/outputting a call sound signal;
a transceiver for transmitting/receiving the call sound signal;
a color display device for displaying a color image; and
a controller for detecting an input of the traffic signal through the handset or the transceiver, for ouputting or transmitting the input traffic signal through the handset or the transceiver, for analyzing the input traffic sound signal to acquire sound analyzed information, and for displaying a traffic sound signal corresponding to the acquired sound analyzed information on the color display
wherein the controller Fourier-transforms the call sound information in frames, acquires a pitch (fundamental frequency), a formant frequency, energy of each formant frequency from the Fourier-transformed information as sound analyzed information, and converts the Fourier-transformed information into image information having an image color, the number of images, a y axis location, and an image size in response to the sound analyzed information.

6. The telephone as claimed in claim 5, wherein the controller Fourier-transforms the call sound information in frames to obtain energy of each frame, acquires a pitch (fundamental frequency), a formant frequency, energy of each formant frequency from the Fourier-transformed information as sound analyzed information, judges a speaker's feeling index in response to the sound analyzed information, and displays character information corresponding to the judged feeling index on the color display device.

7. The telephone as claimed in claim 6, wherein the controller outputs the speaker's fundamental and reference frequencies according to the energy and pitch, outputs an average energy and a fundamentally average frequency in a predetermined time unit, and judges the sneaker's feeling change according to change rates of the average energy and the fundamentally average frequency.

8. The telephone as claimed in claim 7, wherein the average fundamental frequency is determined as an average of two fundamental frequencies except a fundamental frequency having a maximal value among the fundamental frequencies of the initial 3 frames, and when the determined average reference frequency is beyond the range from 80 Hz to 600. Hz, a greater one of the two fundamental frequency is determined as the reference frequency.

9. The telephone as claimed in claim 7, wherein the predetermined time unit is three frames.

10. The telephone as claimed in claim 5, wherein the controller Fourier-transforms the call sound signal in frames to obtain energy of each frame, acquires a pitch (fundamental frequency), a formant frequency, energy of each formant frequency from the Fourier-transformed information as sound analyzed information, judges a speaker's purity degree index in response to the sound analyzed information, and displays character information corresponding to the judged purity degree index on the color display device.

11. The telephone as claimed in claim 10, wherein the controller obtains a chroma of a total color every frame and outputs a purity degree proportional to a chroma level.

12. A sound/image converting method for a traffic sound in a telephone including a color display device, the method comprising the steps of:
receiving a called party's traffic sound data; sampling sound analyzing information of a traffic sound from the called party's traffic sound data received;
forming a traffic sound image corresponding to the sampled sound analyzing information; and
synchronizing the traffic sound image with an output of the call sound and displaying a color image on the color display device of the telephone
wherein the step of forming traffic sound image Fourier-transforming the traffic sound data in frames to obtain energy of each frame, acquiring a pitch (fundamental frequency), a formant frequency, energy of each formant frequency from the Fourier-transformed information as sound analyzed information, judging a speaker's feeling index in response to the sound analyzed information, and displaying character information corresponding to the judged feeling index on the color display device.

13. The method as claimed in claim 12, wherein the step of forming traffic sound image Fourier-transforming the traffic sound data in frames to obtain energy of each frame, acquiring a pitch (fundamental frequency), a formant frequency, energy of each formant frequency from the Fourier-transformed information as sound analyzed information, judging a speaker's purity degree index in response to the sound analyzed information, and displaying character information corresponding to the judged purity degree index on the color display device.

14. The method as claimed in claim 12, wherein the step of forming traffic sound image Fourier-transforming the traffic sound data in frames to obtain energy of each frame, obtain a pitch (fundamental frequency) from the Fourier-transformed information, displaying a color corresponding to the obtained fundamental frequency as a base color, and a waveform of a traffic sound having a circle shape on the base color through the color display device, a size of the circle shape is proportioned to a volume.

* * * * *